(12) United States Patent
Mahvash et al.

(10) Patent No.: US 12,680,970 B2
(45) Date of Patent: Jul. 14, 2026

(54) METHODS AND SYSTEMS FOR X-RAY SCATTEROMETRY MEASUREMENTS EMPLOYING A MACHINE LEARNING BASED ELECTROMAGNETIC RESPONSE MODEL

(71) Applicant: KLA Corporation, Milpitas, CA (US)

(72) Inventors: Mohsen Mahvash, San Jose, CA (US); John J. Hench, Los Gatos, CA (US); Samad Jafarzanjani, Ann Arbor, MI (US); Rebecca Shen, Santa Clara, CA (US); Christopher D. Liman, Milpitas, CA (US); Boxue Chen, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 912 days.

(21) Appl. No.: 17/888,776

(22) Filed: Aug. 16, 2022

(65) Prior Publication Data

US 2024/0060914 A1     Feb. 22, 2024

(51) Int. Cl.
| | |
|---|---|
| *G01N 23/205* | (2018.01) |
| *G01N 23/2055* | (2018.01) |
| *G06N 3/045* | (2023.01) |

(52) U.S. Cl.
CPC ....... *G01N 23/205* (2013.01); *G01N 23/2055* (2013.01); *G06N 3/045* (2023.01); *G01N 2223/0566* (2013.01); *G01N 2223/1016* (2013.01); *G01N 2223/204* (2013.01); *G01N 2223/304* (2013.01); *G01N 2223/305* (2013.01); *G01N 2223/6116* (2013.01); *G01N 2223/6462* (2013.01)

(58) Field of Classification Search
USPC ............................................................. 702/8
See application file for complete search history.

(56) References Cited

U.S. PATENT DOCUMENTS

| | | | |
|---|---|---|---|
| 5,608,526 | A | 3/1997 | Piwonka-Corle et al. |
| 5,859,424 | A | 1/1999 | Norton et al. |
| 6,023,338 | A | 2/2000 | Bareket |

(Continued)

OTHER PUBLICATIONS

Lemaillet, Germer, Kline et al., "Intercomparison between optical and x-ray scatterometry measurements of FinFET structures" by Proc. SPIE, v.8681, p. 86810Q (2013).

(Continued)

*Primary Examiner* — Paul D Lee
(74) *Attorney, Agent, or Firm* — Spano Law Group

(57) ABSTRACT

Methods and systems for estimating values of parameters of interest from X-ray scatterometry measurements with reduced computational effort are described herein. Values of parameters of interest are estimated by regression using a trained, machine learning (ML) based electromagnetic (EM) response model. A training data set includes sets of Design Of Experiments (DOE) values of parameters of interest and corresponding DOE values of a plurality of electromagnetic response metrics. In some examples, values of parameters of interest are determined from measured images based on regression using a sequence of trained ML based electromagnetic response models. In some examples, input values employed to train the ML based EM response model are scaled based on model output variation.

20 Claims, 10 Drawing Sheets

(56)       References Cited

U.S. PATENT DOCUMENTS

| | | | |
|---|---|---|---|
| 6,429,943 B1 | 8/2002 | Opsal et al. | |
| 6,716,646 B1 | 4/2004 | Wright et al. | |
| 6,778,275 B2 | 8/2004 | Bowes | |
| 6,787,773 B1 | 9/2004 | Lee | |
| 6,992,764 B1 | 1/2006 | Yang et al. | |
| 7,242,477 B2 | 7/2007 | Mieher et al. | |
| 7,321,426 B1 | 1/2008 | Poslavsky et al. | |
| 7,406,153 B2 | 7/2008 | Berman | |
| 7,478,019 B2 | 1/2009 | Zangooie et al. | |
| 7,626,702 B2 | 12/2009 | Ausschnitt et al. | |
| 7,656,528 B2 | 2/2010 | Abdulhalim et al. | |
| 7,826,071 B2 | 11/2010 | Shchegrov et al. | |
| 7,842,933 B2 | 11/2010 | Shur et al. | |
| 7,873,585 B2 | 1/2011 | Izikson | |
| 7,929,667 B1 | 4/2011 | Zhuang et al. | |
| 7,933,026 B2 | 4/2011 | Opsal et al. | |
| 8,068,662 B2 | 11/2011 | Zhang et al. | |
| 8,138,498 B2 | 3/2012 | Ghinovker | |
| 9,291,554 B2 | 3/2016 | Kuznetsov et al. | |
| 9,710,728 B2 | 7/2017 | Pandev et al. | |
| 9,826,614 B1 | 11/2017 | Bakeman et al. | |
| 9,885,962 B2 | 2/2018 | Veldman et al. | |
| 9,915,522 B1 | 3/2018 | Jiang et al. | |
| 10,013,518 B2 | 7/2018 | Bakeman et al. | |
| 10,101,670 B2 | 10/2018 | Pandev et al. | |
| 10,152,678 B2 | 12/2018 | Pandev et al. | |
| 10,324,050 B2 | 6/2019 | Hench et al. | |
| 10,352,695 B2 | 7/2019 | Dziura et al. | |
| 2003/0021465 A1 | 1/2003 | Adel et al. | |
| 2006/0187466 A1 | 8/2006 | Li et al. | |
| 2007/0176128 A1 | 8/2007 | Van Bilsen et al. | |
| 2007/0221842 A1 | 9/2007 | Morokuma et al. | |
| 2009/0152463 A1 | 6/2009 | Toyoda et al. | |
| 2011/0266440 A1 | 11/2011 | Boughorbel et al. | |
| 2012/0292502 A1 | 11/2012 | Langer et al. | |
| 2013/0208279 A1 | 8/2013 | Smith | |
| 2013/0304424 A1 | 11/2013 | Bakeman et al. | |
| 2014/0019097 A1 | 1/2014 | Bakeman et al. | |
| 2014/0064445 A1 | 3/2014 | Adler | |
| 2014/0111791 A1 | 4/2014 | Manassen et al. | |
| 2014/0172394 A1 | 6/2014 | Kuznetsov et al. | |
| 2014/0222380 A1 | 8/2014 | Kuznetsov et al. | |
| 2014/0297211 A1 | 10/2014 | Pandev et al. | |
| 2015/0032398 A1* | 1/2015 | Peterlinz | G01N 23/203 |
| | | | 702/81 |
| 2015/0046121 A1 | 2/2015 | Dziura et al. | |
| 2015/0051877 A1* | 2/2015 | Bakeman | G01N 23/223 |
| | | | 703/1 |
| 2015/0110249 A1 | 4/2015 | Bakeman et al. | |
| 2015/0117610 A1 | 4/2015 | Veldman et al. | |
| 2015/0204664 A1 | 7/2015 | Bringoltz et al. | |
| 2015/0285749 A1 | 10/2015 | Moncton et al. | |
| 2015/0300965 A1 | 10/2015 | Sezginer et al. | |
| 2016/0202193 A1 | 7/2016 | Hench et al. | |
| 2016/0320319 A1 | 11/2016 | Hench et al. | |
| 2017/0167862 A1 | 6/2017 | Dziura et al. | |
| 2018/0106735 A1 | 4/2018 | Gellineau et al. | |
| 2018/0113084 A1 | 4/2018 | Hench et al. | |
| 2018/0328868 A1 | 11/2018 | Bykanov et al. | |
| 2019/0017946 A1 | 1/2019 | Wack et al. | |
| 2019/0293578 A1 | 9/2019 | Gellineau | |
| 2020/0025554 A1 | 1/2020 | Gellineau et al. | |
| 2021/0109453 A1 | 4/2021 | Pandev | |
| 2021/0207956 A1 | 7/2021 | Shchegrov et al. | |
| 2021/0341397 A1 | 11/2021 | Ginsburg et al. | |
| 2022/0114438 A1* | 4/2022 | Pandev | G01N 21/211 |

OTHER PUBLICATIONS

Kline et al., "X-ray scattering critical dimensional metrology using a compact x-ray source for next generation semiconductor devices," J. Micro/Nanolith. MEMS MOEMS 16(1), 014001 (Jan.-Mar. 2017).
International Search Report mailed on Aug. 10, 2023, for PCT Application No. PCT/US2023/018765. Filed on Apr. 17, 2023 by KLA Corporation, 4 pages.

* cited by examiner

191

$R^2 < 0.9$ $R^2 > 0.9$

192

$R^2 < 0.9$ $R^2 > 0.9$

193

194

METHODS AND SYSTEMS FOR X-RAY SCATTEROMETRY MEASUREMENTS EMPLOYING A MACHINE LEARNING BASED ELECTROMAGNETIC RESPONSE MODEL

TECHNICAL FIELD

The described embodiments relate to metrology systems and methods, and more particularly to methods and systems for improved measurement of semiconductor structures.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Metrology processes are used at various steps during a semiconductor manufacturing process to detect defects on wafers to promote higher yield. A number of metrology based techniques including scatterometry and reflectometry implementations and associated analysis algorithms are commonly used to characterize critical dimensions, film thicknesses, composition and other parameters of nanoscale structures.

Traditionally, scatterometry critical dimension (SCD) measurements are performed on targets consisting of thin films and/or repeated periodic structures. During device fabrication, these films and periodic structures typically represent the actual device geometry and material structure or an intermediate design. As devices (e.g., logic and memory devices) move toward smaller nanometer-scale dimensions, characterization becomes more difficult. Devices incorporating complex three-dimensional geometry and materials with diverse physical properties contribute to characterization difficulty. For example, modern memory structures are often high-aspect ratio, three-dimensional structures that make it difficult for optical radiation to penetrate to the bottom layers. Optical metrology tools utilizing infrared to visible light can penetrate many layers of translucent materials, but longer wavelengths that provide good depth of penetration do not provide sufficient sensitivity to small anomalies. In addition, the increasing number of parameters required to characterize complex structures (e.g., FinFETs), leads to increasing parameter correlation. As a result, the parameters characterizing the target often cannot be reliably decoupled.

In one example, longer wavelengths (e.g. near infrared) have been employed in an attempt to overcome penetration issues for 3D FLASH devices that utilize polysilicon as one of the alternating materials in the stack. However, the mirror like structure of 3D FLASH intrinsically causes decreasing light intensity as the illumination propagates deeper into the film stack. This causes sensitivity loss and correlation issues at depth. In this scenario, SCD is only able to successfully extract a reduced set of metrology dimensions with high sensitivity and low correlation.

In another example, opaque, high-k materials are increasingly employed in modern semiconductor structures. Optical radiation is often unable to penetrate layers constructed of these materials. As a result, measurements with thin-film scatterometry tools such as ellipsometers or reflectometers are becoming increasingly challenging.

In response to these challenges, more complex optical metrology tools have been developed. For example, tools with multiple angles of illumination, shorter illumination wavelengths, broader ranges of illumination wavelengths, and more complete information acquisition from reflected signals (e.g., measuring multiple Mueller matrix elements in addition to the more conventional reflectivity or ellipsometric signals) have been developed. In addition, X-Ray scatterometry systems, such as transmission, small angle x-ray scatterometry (T-SAXS) systems, have shown promise to address challenging measurement applications. These X-Ray based scatterometry systems also feature large ranges of illumination angles, broad ranges of illumination wavelengths, etc. Although state of the art optical and X-ray scatterometry systems enable challenging measurement applications, the computational effort required to estimate values of parameters of interest has emerged as a limiting performance issue.

Many metrology techniques, including X-ray based scatterometry, are indirect methods of measuring physical properties of a specimen under measurement. In most cases, the raw measurement signals, e.g., measured images, cannot be used to directly determine the physical properties of the specimen. Instead, a measurement model or a pre-computed library of model solutions is employed to estimate the values of one or more parameters of interest based on the raw measurement signals. For example, scatterometry is an indirect method of measuring physical properties of the specimen under measurement. In general, a physics-based measurement model or a machine learning based measurement model is employed to determine the physical properties of the specimen based on the raw measurement signals, e.g., measured images.

In some examples, a physics-based measurement model is created that attempts to predict the raw measurement signals based on assumed values of one or more model parameters. The physics-based measurement model includes parameters associated with the metrology tool itself, e.g., machine parameters, and parameters characterizing the specimen under measurement. Machine parameters are parameters used to characterize the metrology tool. Exemplary machine parameters include angle of incidence (AOI), azimuth angle (Az), beam flux, beam divergence, etc. Specimen parameters are parameters used to characterize the specimen (e.g., material and geometric parameters characterizing the structure(s) under measurement). For a CD specimen, exemplary specimen parameters include geometric parameter values associated with different layers, refractive indices associated with different layers, etc. For measurement purposes, the machine parameters and many of the specimen parameters are treated as known, fixed valued parameters, and the values of one or more specimen parameters of interest are treated as unknown, floating parameter values.

In some examples, the values of the floating parameters of interest are resolved by an iterative process (e.g., regression) that produces the best fit between theoretical predictions and experimental data. The values of the unknown, floating parameters of interest are varied and the model output values, e.g., simulated pixelated images, are calculated and compared to the measured images in an iterative manner until a set of specimen parameter values are determined that results in a sufficiently close match between the model output values, e.g., simulated images, and the experimentally measured values, e.g., measured images. The process of matching typically involves the use of a regression engine, that adjusts parametric values that determine the shape and composition of the model until a suitable cost function related to the difference between measured and simulated orders is minimized. In some other examples, the floating parameters are resolved by a search through a library of pre-computed solutions to find the closest match.

Employing regression directly to estimate values of one or more parameters of interest has proven successful, including parameters characterizing memory structures. However, the computational cost associated with the electromagnetic simulations underlying a physics-based measurement model is a serious disadvantage. Typical memory structures are large periodic structures having a height of several micrometers. Thus, the number of parameters employed to characterize complex structures is very large. For this reason, the computational effort required to construct geometric models associated with a given parameter set as well as calculate electromagnetic scattering efficiencies is limiting. Furthermore, most regression engines require the calculation of parametric derivatives of the scattering efficiencies. This is computationally intensive and increasingly impractical.

In some other examples, a trained machine learning based measurement model is employed to directly estimate values of parameters of interest based on raw measurement data. In these examples, a machine learning based measurement model takes raw measurement signals, e.g., measured images, as model input and estimates values of the parameters of interest as model output.

Performing measurements based on a trained machine learning based model requires much less computational effort compared to regression of a physics-based model. However, the machine learning based measurement model must be trained to generate useful estimates of parameters of interest for a particular measurement application.

A machine learning based measurement model is parameterized by a number of weight parameters. Traditionally, the machine learning based measurement model is trained by a regression process (e.g., ordinary least squares regression). Generally, model training is based on simulated images associated with known values of the parameters of interest (i.e., Design of Experiments (DOE) data). The values of the weight parameters are iteratively adjusted to minimize the differences between the known, DOE values of the parameters of interest and values of the parameters of interest estimated by the machine learning based measurement model based on the simulated DOE image data. In a typical measurement application, hundreds of thousands of images are simulated to train the machine learning based model. Thus, the computational effort required to train a machine learning based measurement model can be excessive as model complexity increases.

Furthermore, a trained machine learning based model often suffers from robustness and accuracy issues. In particular, some variations of parameter values result in similar images, and the trained machine learning based measurement model is unable to distinguish these parameter values.

Future metrology applications present challenges for metrology due to increasingly small resolution requirements, multi-parameter correlation, increasingly complex geometric structures, and increasing use of opaque materials. Thus, methods and systems for generating and implementing measurement models having high accuracy with reduced computational effort are desired.

SUMMARY

Methods and systems for estimating values of parameters of interest from X-ray scatterometry measurements with reduced computational effort are described herein. Values of parameters of interest are estimated by regression using a trained, machine learning (ML) based electromagnetic (EM) response model. The ML based electromagnetic response model effectively replaces traditional three dimensional structure discretization and physics based electromagnetic response simulation in a measurement model based regression on X-ray scatterometry data.

The trained, ML based electromagnetic response model is computationally much more efficient than a physics based electromagnetic response model. Thus, accurate X-ray scatterometry measurements of complex semiconductor structures are realized with less computational effort.

In one aspect, the machine learning based electromagnetic response model is trained based on a training data set including sets of Design Of Experiments (DOE) values of parameters of interest and corresponding DOE values of a plurality of electromagnetic response metrics. The training involves a regression on the training data set to minimize an objective function characterizing errors between the DOE values of the plurality of electromagnetic response metrics and values of the plurality of electromagnetic response metrics determined using the machine learning based electromagnetic response model.

In another aspect, the performance of a trained ML based EM response model is evaluated to determine if additional training is required before implementation of the trained model.

In another aspect, values of parameters of interest are determined from measured images of structures under measurement based on regression using a sequence of trained ML based electromagnetic response models.

In another aspect, values of parameters of interest are determined from measured images of structures under measurement based on regression using a combination of a trained ML based electromagnetic response model and a physics based electromagnetic solver. More specifically, the goodness of fit associated with each electromagnetic response metric is evaluated to determine whether each particular electromagnetic response metric should be calculated by the trained ML based electromagnetic response model or a physics based electromagnetic solver.

In another aspect, model training speed and accuracy is improved by scaling the DOE values of the parameters of interest based on the corresponding values of the plurality of electromagnetic response metrics determined using the machine learning based electromagnetic response model during training.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for estimating values of parameters of interest from X-ray scatterometry measurements with reduced computational effort are described herein. More specifically, values of parameters of interest are estimated by regression using a trained, machine learning based electromagnetic response model. The ML based electromagnetic response model effectively replaces traditional three dimensional structure discretization and physics based electromagnetic response simulation in a measurement model based regression on X-ray scatterometry data. The trained, machine learning (ML) based electromagnetic response model is computationally much more efficient than a physics based electromagnetic response model. Thus, accurate X-ray scatterometry measurements of complex semiconductor structures are realized with less computational effort.

Figure 1:
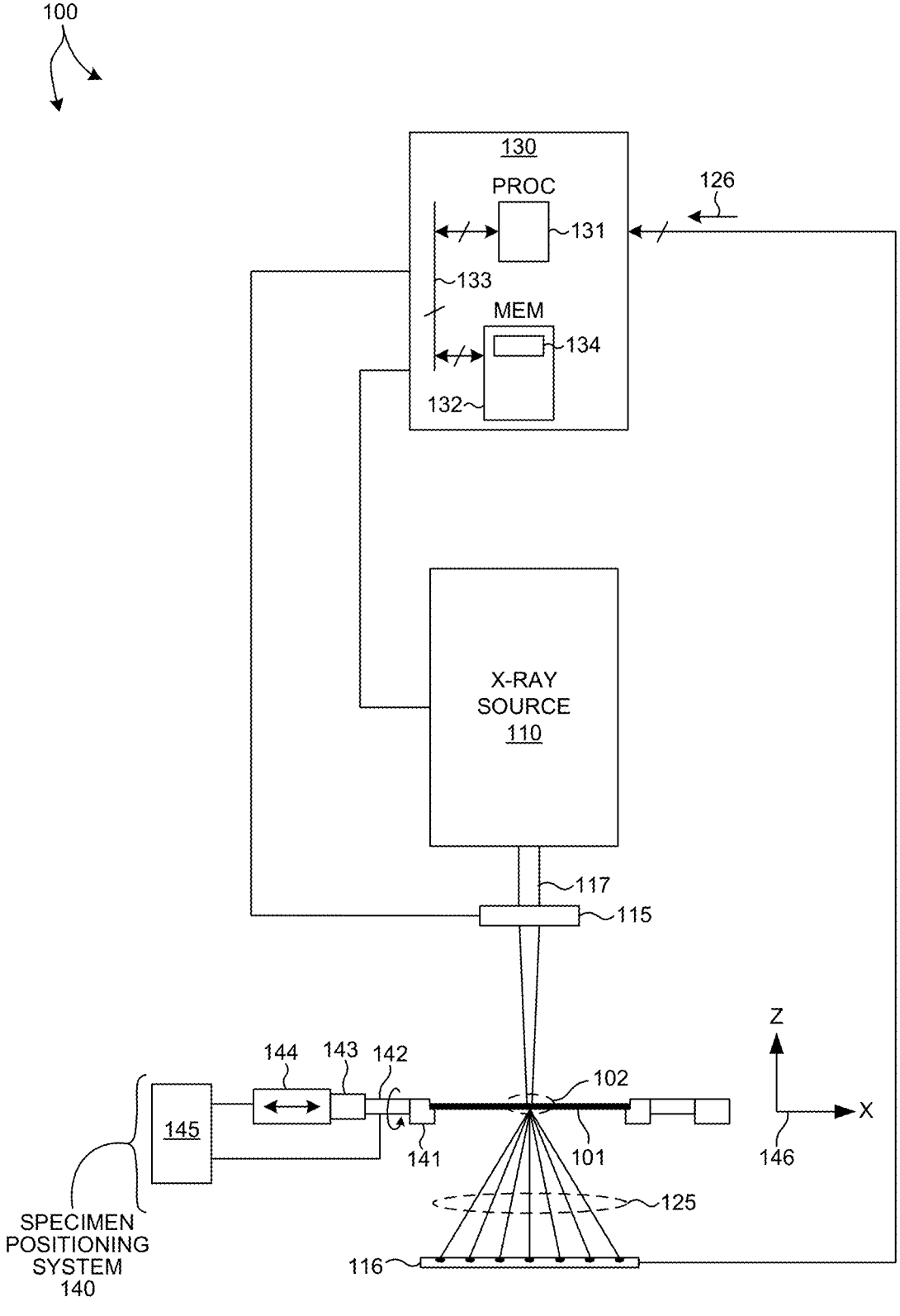
FIG. 1 is a diagram illustrative of a metrology system 100 configured to measure characteristics of a specimen in accordance with the methods described herein.

FIG. 1 illustrates an embodiment of a metrology system 100 for measuring characteristics of a specimen in accordance with the exemplary methods presented herein. As shown in FIG. 1, the system 100 may be used to perform x-ray scatterometry measurements over an inspection area 102 of a specimen 101 disposed on a specimen positioning system 140.

In the depicted embodiment, metrology tool 100 includes an x-ray illumination source 110 configured to generate x-ray radiation suitable for x-ray scatterometry measurements. In some embodiments, the x-ray illumination system 110 is configured to generate wavelengths between 0.01 nanometers and 1 nanometer. X-ray illumination source 110 produces an x-ray beam 117 incident on inspection area 102 of specimen 101.

In general, any suitable high-brightness x-ray illumination source capable of generating high brightness x-rays at flux levels sufficient to enable high-throughput, inline metrology may be contemplated to supply x-ray illumination for x-ray scatterometry measurements. In some embodiments, an x-ray source includes a tunable monochromator that enables the x-ray source to deliver x-ray radiation at different, selectable wavelengths.

In some embodiments, one or more x-ray sources emitting radiation with photon energy greater than 15 keV are employed to ensure that the x-ray source supplies light at wavelengths that allow sufficient transmission through the entire device as well as the wafer substrate. By way of non-limiting example, any of a particle accelerator source, a liquid anode source, a rotating anode source, a stationary, solid anode source, a microfocus source, a microfocus rotating anode source, and an inverse Compton source may be employed as x-ray source 110. In one example, an inverse Compton source available from Lyncean Technologies, Inc., Palo Alto, California (USA) may be contemplated. Inverse Compton sources have an additional advantage of being able to produce x-rays over a range of photon energies, thereby enabling the x-ray source to deliver x-ray radiation at different, selectable wavelengths.

Figure 2:
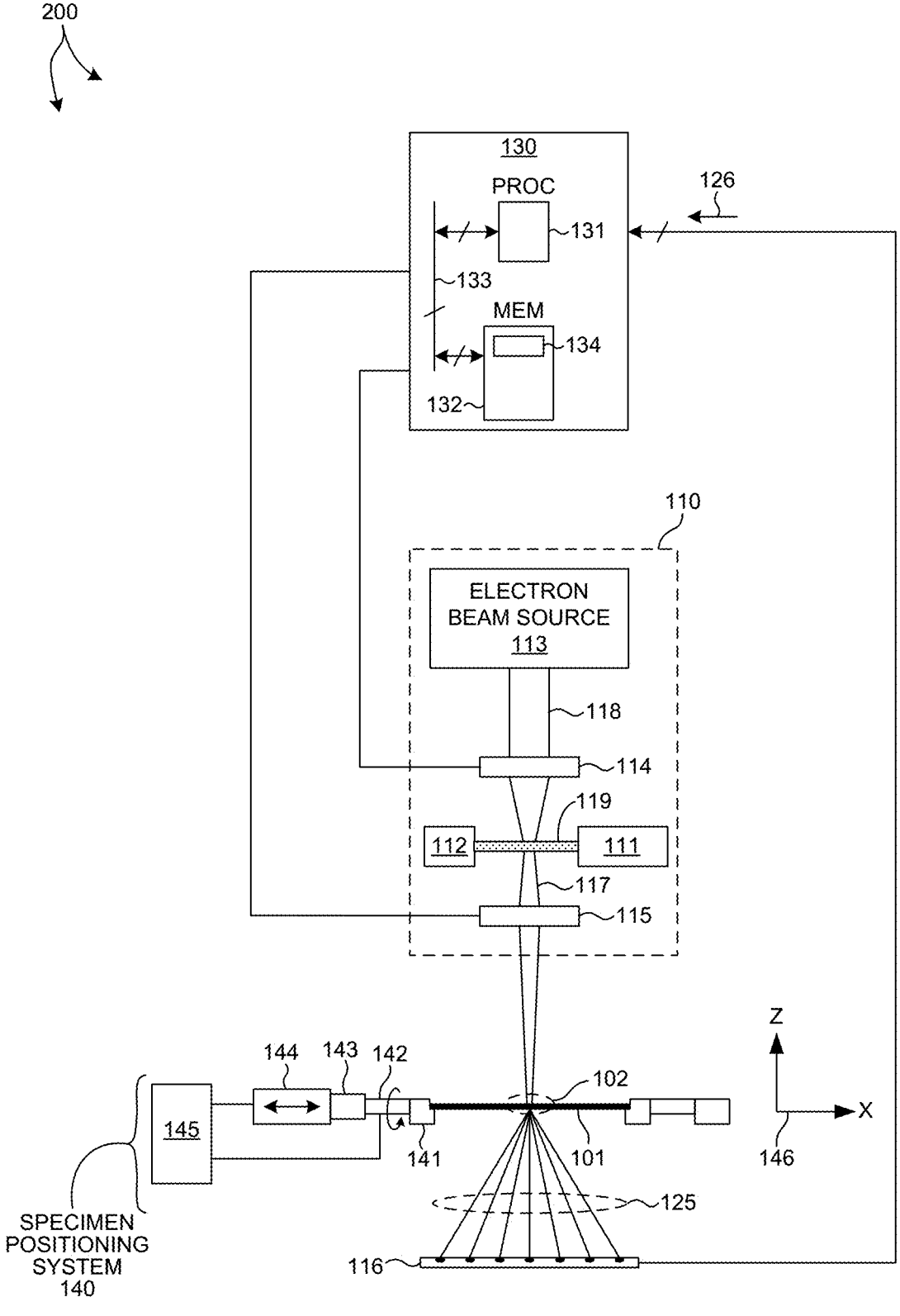
FIG. 2 is a diagram illustrative of a metrology system 200 in another embodiment configured to measure characteristics of a specimen in accordance with the methods presented herein.

Exemplary x-ray sources include electron beam sources configured to bombard solid or liquid targets to stimulate x-ray radiation. FIG. 2 depicts a metrology system 200 for measuring characteristics of a specimen in accordance with the exemplary methods presented herein. Like numbered elements of metrology tool 100 and 200 are analogous. However, in the embodiment depicted in FIG. 2, x-ray illumination source 110 is a liquid metal based x-ray illumination system. A jet of liquid metal 119 is produced from a liquid metal container 111 and collected in a liquid metal collector 112. A liquid metal circulation system (not shown) returns liquid metal collected by collector 112 to liquid metal container 111. The jet of liquid metal 119 includes one or more elements. By way of non-limiting example, the jet of liquid metal 119 includes any of Aluminum, Gallium, Indium, Tin, Thallium, and Bismuth. In this manner, the jet of liquid metal 119 produces x-ray lines corresponding with its constituent elements. In one embodiment, the jet of liquid metal includes a Gallium and Indium alloy. In some embodiments, the x-ray illumination system 110 is configured to generate wavelengths between 0.01 nanometers and 1 nanometer. An electron beam source 113 (e.g., electron gun) produces a stream of electrons 118 that is directed by electron optics 114 to the jet of liquid metal 119. Suitable electron optics 114 includes electromagnets, permanent magnets, or a combination of electromagnets and permanent magnets for focusing the electron beam and directing the beam at the liquid metal jet. The coincidence of the jet of liquid metal 119 and the stream of electrons 118 produces an x-ray beam 117 incident on inspection area 102 of specimen 101.

Methods and systems for generating high brightness, liquid metal x-ray illumination are described in U.S. Pat. No. 7,929,667, issued on Apr. 19, 2011, to KLA-Tencor Corp., the entirety of which is incorporated herein by reference.

In one embodiment, the incident x-ray beam 117 is at the Indium kα line of 24.2 keV. The x-ray beam is collimated down to less than one milliradian divergence using multilayer x-ray optics for x-ray scatterometry measurements.

In some embodiments, x-ray scattering measurements described herein are achieved without using a screen located between the x-ray source and the specimen under measurement. In these embodiments, the measured intensities of the incident beam over a range of angles of incidence, multiple wavelengths, or a combination of both, provide sufficient information to resolve a distribution map (i.e., image) of a desired material property (e.g., complex refractive index, electron density, or absorptivity) of the measured structure. However, in some other examples, a pinhole or another aperture is located on an otherwise opaque screen that is located between the x-ray source and the specimen under measurement to improve collimation of the x-ray beam. The intensity of the diffraction pattern is measured for several positions of the aperture. In some other embodiments, a screen with a pseudo-random aperture pattern is used, and the diffraction pattern is measured for multiple screens. These approaches may also be contemplated to provide additional information to resolve the three-dimensional distribution of the desired material property of the measured structure.

In some embodiments, the profile of the incident x-ray beam is controlled by two or more apertures, slits, or a combination thereof. In a further embodiment, the apertures, slits, or both, are configured to rotate in coordination with the orientation of the specimen to optimize the profile of the incident beam for each angle of incidence, azimuth angle, or both.

As depicted in FIG. 1, x-ray optics 115 shape and direct incident x-ray beam 117 to specimen 101. In some examples, x-ray optics 115 include an x-ray monochromator to monochromatize the x-ray beam that is incident on the specimen 101. In one example, a crystal monochromator such as a Loxley-Tanner-Bowen monochromator is employed to monochromatize the beam of x-ray radiation. In some examples, x-ray optics 115 collimate or focus the x-ray beam 117 onto inspection area 102 of specimen 101 to less than 1 milliradian divergence using multilayer x-ray optics. In some embodiments, x-ray optics 115 includes one or more x-ray collimating mirrors, x-ray apertures, x-ray beam stops, refractive x-ray optics, diffractive optics such as zone plates, specular x-ray optics such as grazing incidence ellipsoidal mirrors, polycapillary optics such as hollow capillary x-ray waveguides, multilayer optics, or systems, or any combination thereof. Further details are described in U.S. Patent Publication No. 2015/0110249, the content of which is incorporated herein by reference it its entirety.

In general, the focal plane of the illumination optics system is optimized for each measurement application. In this manner, system 100 is configured to locate the focal plane at various depths within the specimen depending on the measurement application.

X-ray detector 116 collects x-ray radiation 125 scattered from specimen 101 and generates an output signal 126 indicative of properties of specimen 101 that are sensitive to the incident x-ray radiation in accordance with an x-ray scatterometry measurement modality. In some embodiments, scattered x-rays 125 are collected by x-ray detector 116 while specimen positioning system 140 locates and orients specimen 101 to produce angularly resolved scattered x-rays.

In some embodiments, an x-ray scatterometry system includes one or more photon counting detectors with high dynamic range (e.g., greater than $10^5$) and thick, highly absorptive crystal substrates that absorb the direct beam (i.e., zero order beam) without damage and with minimal parasitic backscattering. In some embodiments, a single photon counting detector detects the position and number of detected photons.

Full beam x-ray scatterometry requires collection of the zero order beam along with higher diffraction orders. The zero order beam is several orders of magnitude more intense than the other orders. If the zero order beam is not fully absorbed in the X-Ray sensitive section of the detector, it will scatter and generate parasitic signals. The strength of these parasitic signals limits the dynamic range of the measurement. For example, if the parasitic signal is $10^{-4}$ of the largest flux signal (i.e., the zero order signal), the signals associated with many higher orders will be contaminated. Thus, it is critical that the detector (e.g., detector 116) exhibit high conversion efficiency of X-rays to electron hole pairs and high X-ray absorption to increase the effective dynamic range of the full beam metrology.

Exemplary detector materials suitable for full beam x-ray scatterometry include Cadmium Telluride (CdTe), Germanium (Ge) and Gallium Arsenide (GaAs) crystals, and others. In some embodiments, the detector material is selected to provide high conversion efficiency in a narrow energy band corresponding to the source energy.

In some embodiments, the thickness of the detector material is selected to achieve the desired absorption of incoming X-rays. In some embodiments, the detector is tilted with respect to the incoming X-ray beams (the various diffraction orders) to increase the path length of the X-ray beams through the detector material, and thus, increase the total amount of absorption.

In some embodiments, dual threshold detectors are employed to improve SNR.

In some embodiments, the x-ray detector resolves one or more x-ray photon energies and produces signals for each x-ray energy component indicative of properties of the specimen. In some embodiments, the x-ray detector 116 includes any of a CCD array, a microchannel plate, a photodiode array, a microstrip proportional counter, a gas filled proportional counter, a scintillator, or a fluorescent material.

In this manner the X-ray photon interactions within the detector are discriminated by energy in addition to pixel location and number of counts. In some embodiments, the X-ray photon interactions are discriminated by comparing the energy of the X-ray photon interaction with a predetermined upper threshold value and a predetermined lower threshold value. In one embodiment, this information is communicated to computing system 130 via output signals 126 for further processing and storage.

In some embodiments, the detector is scanned relative to the incoming X-rays to mitigate damage or excessive charging from the incident zero order beam. In some of these embodiments, the detector is continuously scanned with respect to the incoming X-rays to avoid having the zero order beam dwell on a particular location on the detector surface for an extended period of time. In some other embodiments, the detector is periodically moved with respect to the incoming X-rays to avoid having the zero order beam dwell on a particular location on the detector surface for an extended period of time. In some embodiments, the scanning or periodic movements are approximately perpendicular to the incoming X-rays. In some embodiments, the movements are rotational (e.g., the detector is rotated such that a particular location on the detector surface traces out a circle in space). In some embodiments, the movements are a combination of translational movements that move the point of incidence of the zero order beam to various different locations on the detector surface.

In an x-ray scatterometry measurement, a structure (e.g., a high aspect ratio, vertically manufactured structure) diffracts a collimated X-ray beam into diffraction orders. Each diffraction order travels in a particular, predictable direction. The angular spacing of the diffraction orders is inversely proportional to the lattice constant of the specimen divided by the wavelength. The diffraction orders are detected by a detector array placed at some distance from the wafer. Each pixel of the detector outputs a signal that indicates the number of photons that hit the pixel.

The intensities of diffraction orders are of the form $I(m,n,\theta,\phi,\lambda)$, where $\{m,n\}$ are integer indices of diffraction orders, $\{\theta,\phi\}$ are elevation and azimuth angles of the incident beam (i.e., polar coordinates of the incident chief ray with respect to a coordinate system that is fixed to the wafer), and $\lambda$ is the wavelength of the incident X-ray.

Several noise sources perturb the illumination light as it exits the illumination and propagates toward the specimen. Exemplary disturbances include electron beam current fluctuation, temperature induced optic drift, etc. The perturbed incident flux is denoted as $F_0(1+n_1)$.

The target scatters the incident radiation in a manner that depends on the azimuth and elevation angles of the incident beam. The efficiency of light scattering into orders (m,n) can be defined as $S_{mn}(\theta,\phi)$. As the diffracted light propagates from the specimen to the detector, the beam passes through other scattering media that affect all orders similarly with some variation $(1+n_2)$ and parasitic noise $(n_3)$. In this manner the total intensity $I_{mn}$ of each order measured in a time, t, can be expressed by equation (1).

$$I_{mn} = S_{mn}(\theta, \phi)(1 + n_2)(1 + n_1)F_0 t + n_3 \qquad (1)$$

In some embodiments, it is desirable to perform measurements at different orientations described by rotations about the x and y axes indicated by coordinate system 146 depicted in FIG. 1. This increases the precision and accuracy of measured parameters and reduces correlations among parameters by extending the number and diversity of data sets available for analysis to include a variety of large-angle, out of plane orientations. Measuring specimen parameters with a deeper, more diverse data set also reduces correlations among parameters and improves measurement accuracy. For example, in a normal orientation, x-ray scatterometry is able to resolve the critical dimension of a feature, but is largely insensitive to sidewall angle and height of a feature. However, by collecting measurement data over a broad range of out of plane angular positions, the sidewall angle and height of a feature can be resolved.

As illustrated in FIG. 1, metrology tool 100 includes a specimen positioning system 140 configured to both align specimen 101 and orient specimen 101 over a large range of out of plane angular orientations with respect the scatterometer. In other words, specimen positioning system 140 is configured to rotate specimen 101 over a large angular range about one or more axes of rotation aligned in-plane with the surface of specimen 101. In some embodiments, specimen positioning system 140 is configured to rotate specimen 101 within a range of at least 90 degrees about one or more axes of rotation aligned in-plane with the surface of specimen 101. In some embodiments, specimen positioning system is configured to rotate specimen 101 within a range of at least 120 degrees about one or more axes of rotation aligned in-plane with the surface of specimen 101. In some other embodiments, specimen positioning system is configured to rotate specimen 101 within a range of at least one degree about one or more axes of rotation aligned in-plane with the surface of specimen 101. In this manner, angle resolved measurements of specimen 101 are collected by metrology system 100 over any number of locations on the surface of specimen 101. In one example, computing system 130 communicates command signals to motion controller 145 of specimen positioning system 140 that indicate the desired position of specimen 101. In response, motion controller 145 generates command signals to the various actuators of specimen positioning system 140 to achieve the desired positioning of specimen 101.

By way of non-limiting example, as illustrated in FIG. 1, specimen positioning system 140 includes an edge grip chuck 141 to fixedly attach specimen 101 to specimen positioning system 140. A rotational actuator 142 is configured to rotate edge grip chuck 141 and the attached specimen 101 with respect to a perimeter frame 143. In the depicted embodiment, rotational actuator 142 is configured to rotate specimen 101 about the x-axis of the coordinate system 146 illustrated in FIG. 1. As depicted in FIG. 1, a rotation of specimen 101 about the z-axis is an in plane rotation of specimen 101. Rotations about the x-axis and the y-axis (not shown) are out of plane rotations of specimen 101 that effectively tilt the surface of the specimen with respect to the metrology elements of metrology system 100. Although it is not illustrated, a second rotational actuator is configured to rotate specimen 101 about the y-axis. A linear actuator 144 is configured to translate perimeter frame 143 in the x-direction. Another linear actuator (not shown) is configured to translate perimeter frame 143 in the y-direction. In this manner, every location on the surface of specimen 101 is available for measurement over a range of out of plane angular positions. For example, in one embodiment, a location of specimen 101 is measured over several angular increments within a range of −45 degrees to +45 degrees with respect to the normal orientation of specimen 101.

In general, specimen positioning system 140 may include any suitable combination of mechanical elements to achieve the desired linear and angular positioning performance, including, but not limited to goniometer stages, hexapod stages, angular stages, and linear stages.

Figure 3:
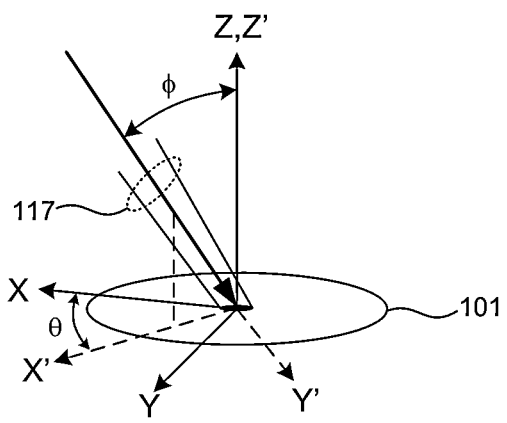
FIG. 3 depicts x-ray illumination beam 117 incident on wafer 101 at a particular orientation described by angles $\phi$ and $\theta$.

As described herein, x-ray scatterometry measurements are performed at multiple orientations of the illuminating x-ray beam relative to the surface normal of the semiconductor wafer. Each orientation is described by any two angular rotations of wafer 101 with respect to the x-ray illumination beam, or vice-versa. In one example, the orientation can be described with respect to a coordinate system fixed to the wafer. FIG. 3 depicts x-ray illumination beam 117 incident on wafer 101 at a particular orientation described by angles $\phi$ and $\theta$. Coordinate frame XYZ is fixed the metrology system and coordinate frame X'Y'Z' is fixed to wafer 101. Z is aligned with an axis normal to the surface of wafer 101. X and Y are in a plane aligned with the surface of wafer 101. Similarly, Z' is aligned with an axis normal to the surface of wafer 101, and X' and Y' are in a plane aligned with the surface of wafer 101. As depicted in FIG. 3, x-ray illumination beam 117 lies within the X'Z' plane. Angle, $\phi$, describes the orientation of the x-ray illumination beam 117 with respect to the surface normal of the wafer in the X'Z' plane. Furthermore, angle, $\theta$, describes the orientation of the X'Z' plane with respect to the XZ plane. Together, $\theta$ and $\phi$, uniquely define the orientation of the x-ray illumination beam 117 with respect to the surface of wafer 101. In this example, the orientation of the x-ray illumination beam with respect to the surface of wafer 101 is described by a rotation about an axis normal to the surface of wafer 101 (i.e., Z axis) and a rotation about an axis aligned with the surface of wafer 101 (i.e., Y' axis). In some other examples, the orientation of the x-ray illumination beam with respect to the surface of wafer 101 is described by a rotation about a first axis aligned with the surface of wafer 101 and another axis aligned with the surface of wafer 101 and perpendicular to the first axis as described with reference to FIG. 1.

In a further aspect, an x-ray scatterometry system is employed to determine properties of a specimen (e.g., structural parameter values) based on x-ray scatterometry images. As depicted in FIG. 1, metrology tool 100 includes a computing system 130 employed to acquire signals 126 generated by detector 116 and determine properties of the specimen based at least in part on the acquired signals.

In one aspect, values of parameters of interest characterizing one or more semiconductor structures under measurement are estimated by regression on detected images using a trained, machine learning based electromagnetic response model. The detected images capture the spatial distribution of scattered diffraction orders at the detector plane of the x-ray scatterometry system.

Figure 4:
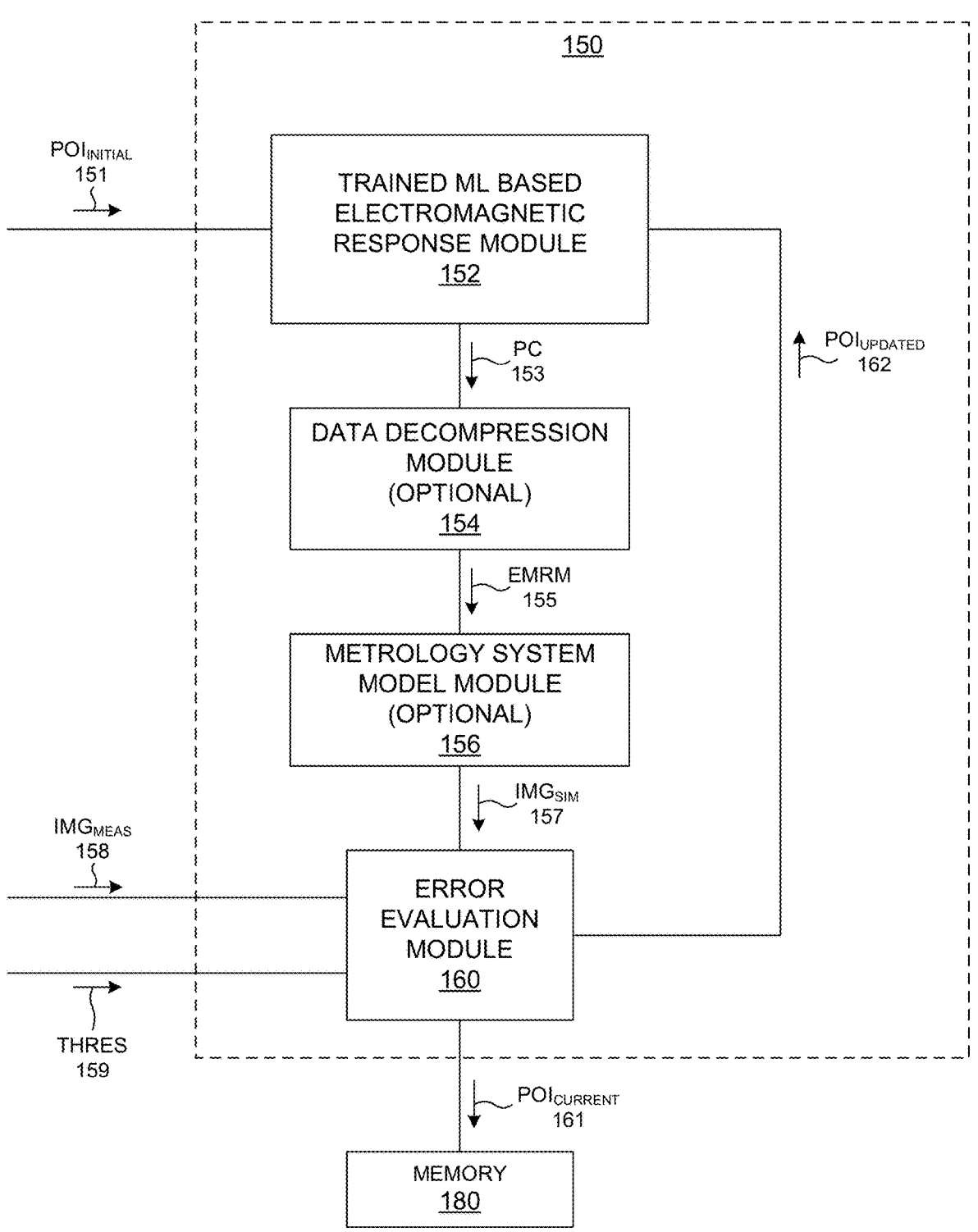
FIG. 4 is a diagram illustrative of a measurement engine 150 configured to resolve specimen parameter values based on x-ray scatterometry data in accordance with the methods described herein.

FIG. 4 is a diagram illustrative of a measurement engine 150 configured to estimate specimen parameter values based on x-ray scatterometry data using a trained, machine learning based electromagnetic response model. In one embodiment depicted in FIG. 1, computing system 130 is configured as a measurement engine 150 to implement measurement functionality as described herein.

In general, values of one or more parameters of interest (e.g., critical dimension, sidewall angle, height, overlay, etc.) are determined by an inverse solution of a pre-determined trained ML based electromagnetic response model. Values of the one or more parameters of interest are provided as input to the trained ML based electromagnetic model. Images determined based on the output of the trained ML based electromagnetic model are compared to actual measured images. The differences are employed to iteratively adjust the values of the one or more parameters of interest. In this manner, target profile parameters are estimated that minimize errors between the measured scattered x-ray intensities and modeled results.

As depicted in FIG. 4, measurement engine 150 includes a trained machine learning based electromagnetic response module 152, a data decompression module 154, a metrology system model module 156, and an error evaluation module 160. Initial values of parameters of interest, POI initial 151, characterizing a structure under measurement are provided as input to trained ML based electromagnetic response module 152. In response, the trained ML based electromagnetic response module 152 computes values of principle components 153. The principle components 153 are communicated to data decompression module 154. Data decompression module 154 maps the values of the principle components 153 to values of electromagnetic response metrics 155. Exemplary electromagnetic response metrics 155 include Q-space parameter values, scattering order efficiencies, scattering coefficients, etc. The electromagnetic response metrics 155 are communicated to metrology system module 156. Metrology system module 156 maps the values of the electromagnetic response metrics 155 to simulated images, IMG sim 157, at the detector surface. The simulated images, IMG sim 157, and measured images, $IMG_{meas}$ 158, are communicated to error evaluation module 160. Error evaluation module 160 evaluates the differences between the measured and simulated images. If the differences are less than a threshold value, THRES 159, the iteration stops and the current values of the parameters of interest, $POI_{current}$ 161, are communicated and stored to memory 180 as the estimated values of the parameters of interest. If the differences are greater than the threshold value, error evaluation module 160 generates updated values of the parameters of interest, $POI_{updated}$ 162.

The updated values are communicated to the trained ML based electromagnetic response model to initiate another iteration of the regression.

In the embodiment depicted in FIG. 4, the trained ML based electromagnetic response model maps geometric parameter values to principle components, the data decompression module maps principle components to electromagnetic response metrics, e.g., scattering order efficiencies, and the metrology system model maps the electromagnetic response metrics to detector images. However, in general, both data decompression module 154 and metrology system module 156 are optional.

In some examples, data compression is not employed to train the ML based electromagnetic response module. In these embodiments, data decompression is not employed, and the trained ML based electromagnetic response model maps geometric parameter values directly to electromagnetic response metrics, such as scattering order efficiencies.

In some examples, the metrology system model is not employed. In these examples, the trained ML based electromagnetic response model maps geometric parameter values to scattering images directly. This approach requires significantly more effort to train the model and the resulting trained model tends to be less accurate.

The metrology system model is a kinematic model that typically does not requires significant computational effort. Separating the metrology system model from the trained ML based electromagnetic response model offers several benefits. By separating the metrology system model from the ML based electromagnetic response model, the dimension of the training samples is reduced from millions of detector pixels to thousands of scattering order efficiencies. This greatly reduces the computational effort required to train the ML based electromagnetic response model. In addition, separating the metrology system model from the ML based electromagnetic response model decouples the trained ML based electromagnetic response model from the metrology system hardware. This makes the trained ML based electromagnetic response model insensitive to hardware changes, such as long-term tool drift, environmental changes, system replacement, system maintenance, etc. These hardware changes affect the metrology system model only and can be compensated by recalibration of the metrology system model without changing the trained ML based electromagnetic response model.

In some examples, the electromagnetic response metrics are Q-space parameter values. In these examples, the trained ML based electromagnetic response model maps geometric parameter values to Q-space parameter values and the metrology system model maps Q-space parameter values to images.

In some other examples, the electromagnetic response metrics are scattering order efficiencies. In these examples, the trained ML based electromagnetic response model maps geometric parameter values to scattering order efficiencies and the metrology system model maps scattering order efficiencies to images.

In some other examples, the electromagnetic response metrics are scattering coefficients, i.e., complex scattering order values. In these examples, the trained ML based electromagnetic response model maps geometric parameter values to scattering coefficients and the metrology system model maps scattering order values to images.

In some other examples, the electromagnetic response metrics are scattering images at the detector. In these examples, the trained, machine learning based electromagnetic response model maps values of the parameters of interest to one or more images at the x-ray detector.

In a further aspect, the machine learning based electromagnetic response model is trained based on a training data set including sets of Design Of Experiments (DOE) values of the parameters of interest and corresponding DOE values of a plurality of electromagnetic response metrics. The training involves a regression on the training data set to minimize an objective function characterizing errors between the DOE values of the plurality of electromagnetic response metrics and values of the plurality of electromagnetic response metrics determined using the machine learning based electromagnetic response model.

Figure 5:
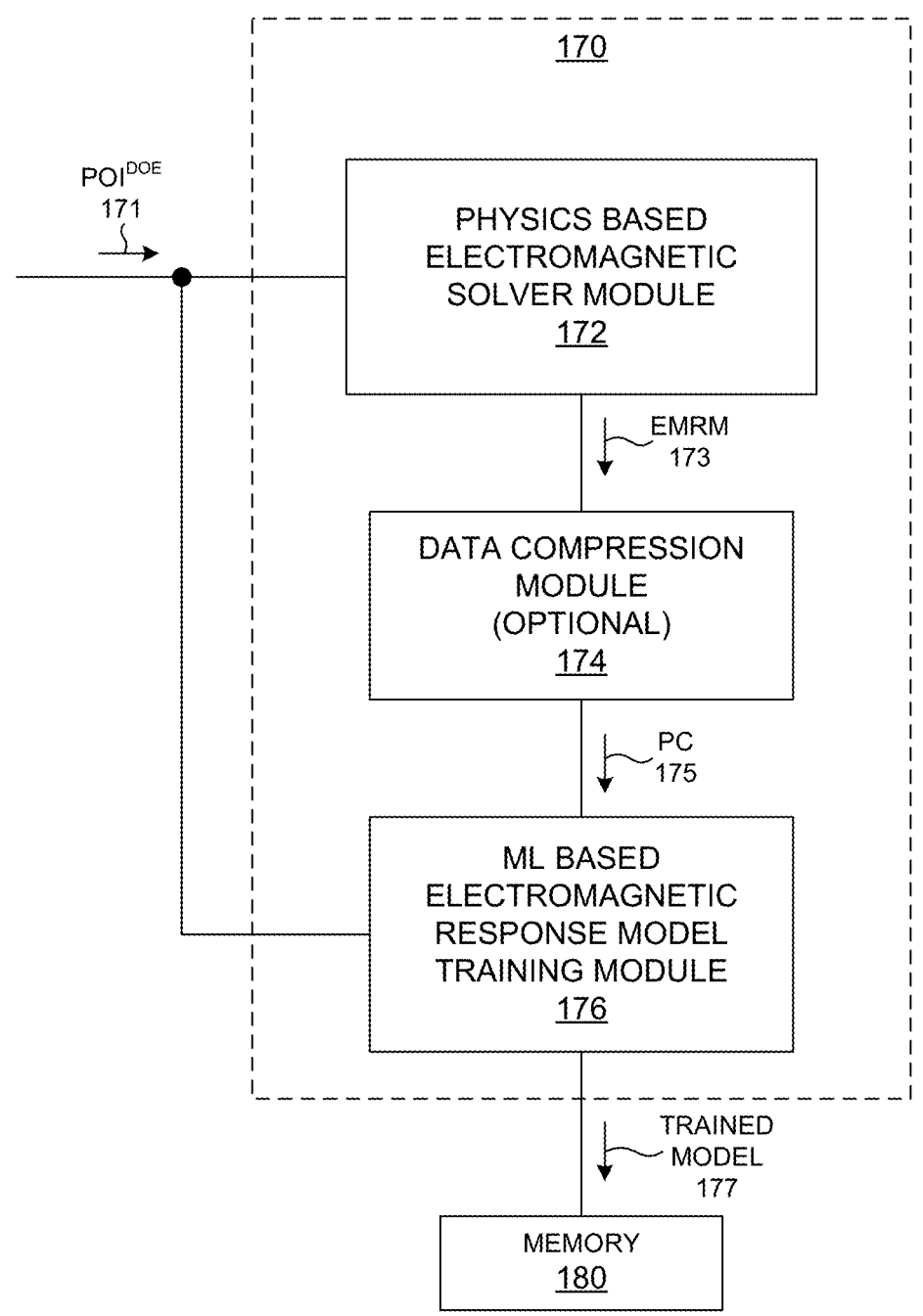
FIG. 5 is a diagram illustrative of a measurement model training engine 170 configured to train a machine learning based electromagnetic response model in accordance with the methods described herein.

FIG. 5 is a diagram illustrative of a measurement model training engine 170 configured to train a machine learning based electromagnetic response model in accordance with the methods described herein. In the embodiment depicted in FIG. 5, a physics based electromagnetic solver is employed to generate DOE values of electromagnetic response metrics, e.g., scattering order efficiencies, for a large range of DOE values of the parameters of interest. The range of DOE values spans the expected process range of the semiconductor structures to be measured. This generates a large training data set including a large number of input-output pairs, e.g., DOE values of parameters of interest and corresponding DOE values of scattering order efficiencies.

A machine learning based electromagnetic response model is then trained to match the projection from inputs to outputs provided by the physics based electromagnetic solver. In this manner, the machine learning based electromagnetic response model is trained to replicate the input-output characteristics of the physics based electromagnetic solver, but with far less computational effort.

As depicted in FIG. 5, a DOE set of values of parameters of interest, $POI^{DOE}$ 171, is communicated to physics based electromagnetic solver module 172. In response, the physics based electromagnetic solver module 172 generates corresponding DOE values of electromagnetic response metrics 173. The DOE values of electromagnetic response metrics 173 are communicated to data compression module 174, and the data compression module maps the DOE values of electromagnetic response metrics 173 to a set of principle components 175. The effectively reduces the dimension of the electromagnetic response metrics.

For typical use cases in x-ray scatterometry, the vector of electromagnetic response metrics 173 is likely to have a very large dimension, e.g., thousands of scattering orders multiplied by tens of angles, e.g., 100 angles. In one example, the training set includes 50,000 different values of several input parameters, and 50,000 corresponding values of electromagnetic response metrics 173. Dimensionality reduction streamlines model training, and in some cases it is necessary to make the training process computationally feasible. In one example, scattering order efficiencies are compressed using principal component analysis (PCA) to reduce the dimension of the data set from 1e5 to 1e2. Exemplary data compression techniques include, but not limited to, PCA, kernel PCA, autoencoding, etc. In general, any suitable data compression technique may be applied to reduce the dimension of the electromagnetic response metrics.

As depicted in FIG. 5, the set of principle components 175 and the corresponding DOE set of parameters of interest, $POI^{DOE}$ 171, are communicated to ML based electromagnetic response model training module 176 for training. The trained ML based electromagnetic response model 177 is communicated and stored to memory 180. In general, the ML based machine learning based model is any suitable ML based model, including, but not limited to tensor product interpolation, radial base interpolation, artificial neural network, support-vector machine, linear model, or any combination thereof.

In some embodiments, ML based electromagnetic response model training module 176 implements a linear or non-linear regression that iteratively tunes the model weighting parameters to achieve a best fit between the principle components generated by the physics based electromagnetic solver and the principle components generated by the ML model under training. In some embodiments, the degree of fit is characterized by an objective function. The objective function includes, but is not limited to, a mathematical expression including a residual value associated with each of the plurality of electromagnetic response metrics. In some examples, the objective function expresses a sum of the squared values of each residual value. In some other examples, the objective function expresses a sum of the squared values of a logarithm of each residual value, etc. In general, any objective function suitable to express the error between the principle components generated by the physics based electromagnetic solver and the principle components generated by the ML model under training may be contemplated within the scope of this patent document.

In a further aspect, the performance of a trained ML based EM response model is evaluated to determine if additional training is required before implementation of the trained model. In some examples, the model is evaluated based on a library quality index that ranges in value from zero to one. If the library quality index reaches a predetermined threshold value, e.g., 0.9, the trained ML based EM response model is considered adequately trained and ready for implementation. If the library quality index falls below the predetermined threshold value, the trained ML based EM response model is subjected to additional training, e.g., further regression.

In other examples, the model is trained based on a maximization of the $R^2$ value of all scattering order efficiencies. If the $R^2$ value of each scattering order efficiency reaches a predetermined threshold value, e.g., 0.9, the trained ML based EM response model is considered adequately trained and ready for implementation. If the $R^2$ value of each scattering order efficiency falls below the predetermined threshold value, the trained ML based EM response model is subjected to additional training, e.g., further regression.

Figures 6, 7:
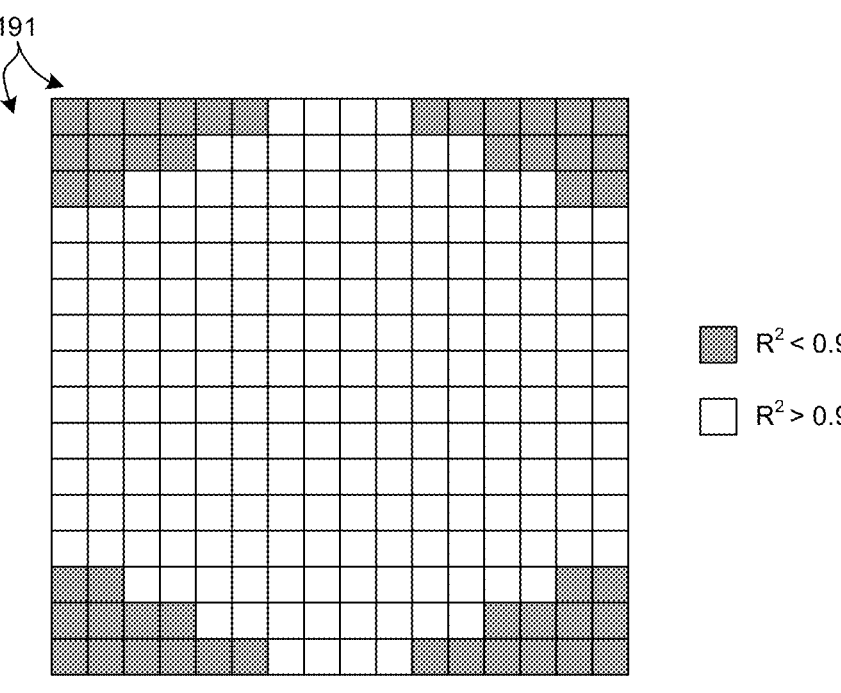
FIG. 6 is a plot illustrative of the $R^2$ value of each scattering order efficiency after initial training of a machine learning based electromagnetic response model.
FIG. 7 is a plot illustrative of the $R^2$ value of each scattering order efficiency after retraining of the machine learning based electromagnetic response model.

FIG. 6 is a plot 191 illustrative of the $R^2$ value of each scattering order efficiency after initial training of a machine learning based electromagnetic response model. As depicted in FIG. 6, the fit of a large number of scattering order efficiencies is characterized by an $R^2$ value greater than 0.9. However, a significant number of scattering order efficiencies are characterized by an $R^2$ value less than 0.9.

FIG. 7 is a plot 192 illustrative of the $R^2$ value of each scattering order efficiency after re-training of the machine learning based electromagnetic response model. As depicted in FIG. 6, the fit of all of the scattering order efficiencies is characterized by an $R^2$ value greater than 0.9 after training.

In another example, the model is trained to minimize the weighted sum of residual values associated with each scattering order efficiency.

Figure 8:
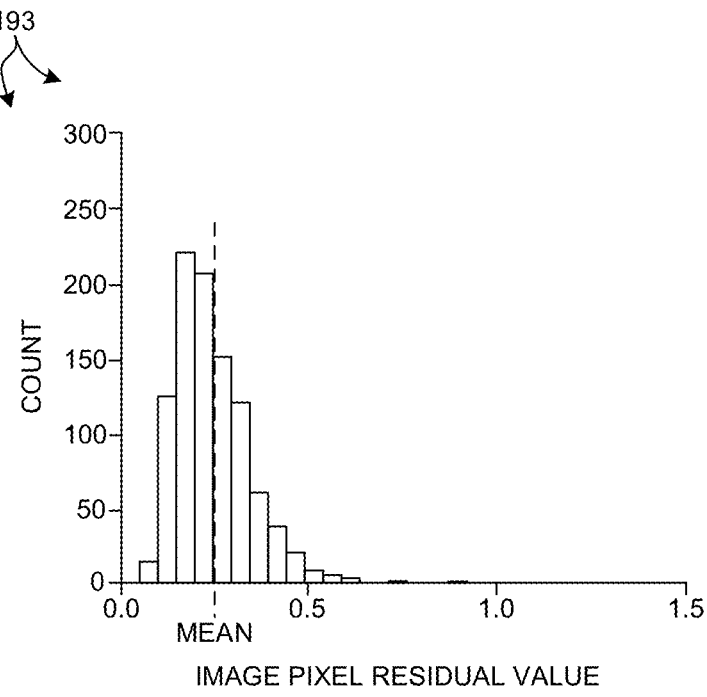
FIG. 8 is a histogram plot illustrative of the number of image pixels having a residual value within different ranges after training of a machine learning based electromagnetic response model.

FIG. 8 is a histogram plot 193 illustrative of the number of image pixels having a residual value within different ranges after initial training of a machine learning based electromagnetic response model. In one example, the residual value is the difference between the intensity at each particular pixel as modelled by the physics based electromagnetic solver and the machine learning based electromagnetic response model. As depicted in FIG. 8, the image pixel residual values are distributed over a range from 0 to 1; with a mean value of approximately 0.25.

Figure 9:
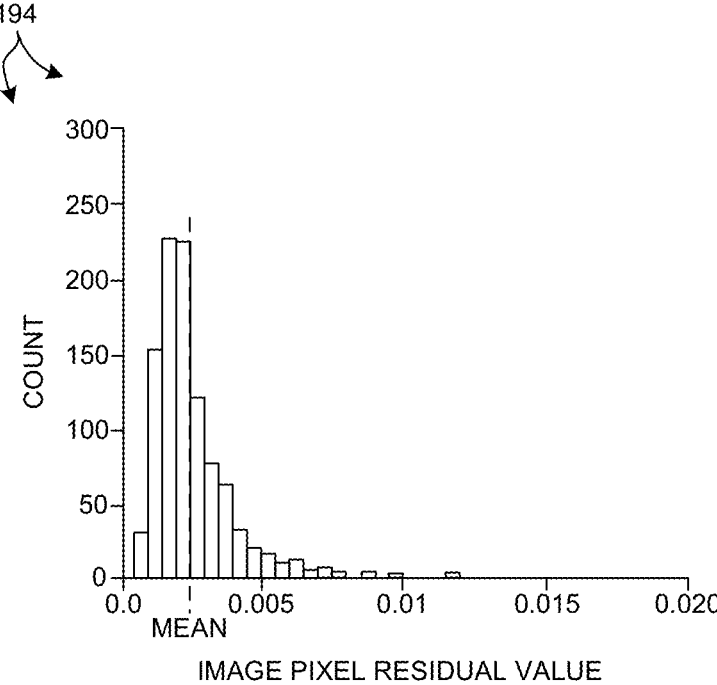
FIG. 9 is a histogram plot illustrative of the number of image pixels having a residual value within different ranges after retraining of the machine learning based electromagnetic response model.

FIG. 9 is a histogram plot 194 illustrative of the number of image pixels characterized by a residual value within different ranges after re-training of the machine learning based electromagnetic response model. As depicted in FIG. 9, the image pixel residual values are distributed over a range from 0 to 0.015; with a mean value of approximately 0.0025. As depicted in FIG. 9, the fit of all of the scattering order efficiencies is characterized by a much smaller residual value after re-training.

In addition to conventional regression, the ML based electromagnetic response model training module 176 may employ any number of advanced regression techniques including, but not limited to, a multi-seed regression, a multi-pass regression, and a regularized regression.

In some examples, these advanced regression techniques improve regression robustness and eliminate multiple local minima. In one example of a multi-seed regress, the measured scattering image is first compared to the library of images generated to train the ML based electromagnetic response model to identify a small number of relatively close matches. The DOE values of the parameters of interest corresponding to the selected images are employed as the initial evaluation points, $POI_{initial}$, in the subsequent regression analysis. In some of these examples, a multiple regressions are initiated at each initial evaluation point and executed in parallel. Furthermore, the best fit is selected as the global minimum.

In one example, one hundred regressions were performed to test the performance of a trained ML based electromagnetic response model compared to a conventional electromagnetic solver. The ML based electromagnetic response model was trained using 500 principal components. A complex memory structure was measured and 11 parameters of interest were floated in the regression. The average solution time employing the electromagnetic solver was 77 seconds. Shape discretization and EM solution time consumed 64 seconds and the metrology system model consumed 13 seconds of the combined 77 seconds. In contrast, the average solution time employing the trained ML based electromagnetic response model was 25 seconds. Trained ML based EM response model solution time consumed 12 seconds and the metrology system model consumed 13 seconds of the combined 25 seconds. Thus, the total regression time is decreased by a factor of 3 using the trained ML based EM response model, and the regression time associated with shape discretization and EM simulation is decreased by a factor of 5.

In the embodiment depicted in FIG. 5, a physics based electromagnetic solver is employed to generate the training data set. However, in some other embodiments, the training data set is obtained from known reference data. In one example, a number of structures are measured to obtain the scattering order efficiencies, and the same structures are measured by a trusted, reference measurement system, e.g., focused ion beam, to directly measure values of the corresponding parameters of interest.

In addition, in the embodiment depicted in FIG. 5, a data compression module is employed to reduce the dimension of the training data employed to train the ML based electromagnetic response model. However, in general, data compression is optional. In these embodiments, the electromagnetic response metrics generated by the physics based electromagnetic solver are employed directly to train the ML based electromagnetic response model.

In another further aspect, values of parameters of interest are determined from measured images of structures under measurement based on regression using a sequence of trained ML based electromagnetic response models.

As described hereinbefore, a first trained ML based electromagnetic response model is employed to estimate values of one or more parameters of interest based on measured X-ray scatterometry images. In some embodiments, an additional set of DOE values of the parameters of interest (e.g., 20-50 additional values) are selected in close proximity to the values of the parameters of interest determined by the first trained ML based electromagnetic response model.

A physics based electromagnetic solver is employed to determine DOE values of a plurality of electromagnetic response metrics corresponding to each additional set of values of the parameters of interest. The additional sets of DOE values of the parameters of interest and the corresponding DOE values of the plurality of electromagnetic response metrics comprise a second training data set. A second machine learning based electromagnetic response model is trained based on the second training data set. Finally, refined values of the parameters of interest characterizing the one or more semiconductor structures under measurement are estimated by regression on the one or more detected images using the second trained, machine learning based electromagnetic response model.

In another further aspect, values of parameters of interest are determined from measured images of structures under measurement based on regression using a combination of a trained ML based electromagnetic response model and a physics based electromagnetic solver. More specifically, the goodness of fit associated with each electromagnetic response metric is evaluated to determine whether each particular electromagnetic response metric should be calculated by the trained ML based electromagnetic response model or a physics based electromagnetic solver.

In one example, a goodness of fit (e.g., R 2, residual, etc.) is determined between the DOE values of each of the plurality of electromagnetic response metrics and the values of each of the plurality of electromagnetic response metrics determined using the machine learning based electromagnetic response model.

If the goodness of fit for a particular electromagnetic response metric is within an acceptable range, e.g., $R^2 > 0.8$, the regression employs the trained, machine learning based electromagnetic response model to compute the value of that particular electromagnetic response metric. However, if the goodness of fit for a particular electromagnetic response metric is outside an acceptable range, e.g., $R^2 < 0.8$, the regression employs the physics based electromagnetic solver to compute the value of that particular electromagnetic response metric.

In this manner, a physics based electromagnetic solver is substituted for a trained ML based electromagnetic response model when the accuracy of the trained ML based electromagnetic response model is inadequate for a particular electromagnetic response metric.

In another further aspect, model training speed and accuracy is improved by scaling the DOE values of the parameters of interest based on the corresponding values of the plurality of electromagnetic response metrics determined using the machine learning based electromagnetic response model during training.

Typically, input values are scaled according to their nominal range values. In one example, input values are scaled according to their nominal range values such that after scaling, the input values are within a range between −1 and 1 when training a ML based model.

However, in some other examples, the input values of the ML based EM response model are scaled according to the variation of the corresponding output values of the ML based EM response model. More specifically, an input value is scaled over a relatively large range when the output residual values vary over a relatively large range for a given change of the input value. Moreover, an input value is scaled over a relatively small range when the output residual values vary over a relatively small range for a given change of the input value. By scaling the input values according to output variation, the training explores a relatively large range of values of an input variable to which the output is sensitive, and a relatively small range of values of an input variable to which the output is relatively insensitive. In one example, the output variation of a particular output variable is evaluated at the extreme values of each input variable, while the values of all other input variables are maintained at the middle of their range. The inverse of the resulting output variation is employed to scale the values of that particular input variable. This is repeated for all of the input variables.

In another example, the range of values of the residual associated with each of the plurality of electromagnetic response metrics is determined based on the corresponding range of DOE values of each parameter of interest. A scaling factor is generated for each parameter of interest. The scaling factor associated with a particular parameter of interest is the range of values of the residual determined over the full range of values of the particular parameter of interest divided by the maximum range of values of the residual determined over the full range of values of each of the parameters of interest. The scaling factor associated with each parameter of interest is applied to the DOE values of each parameter of interest during subsequent model training iterations, i.e., model re-training.

Figure 12:
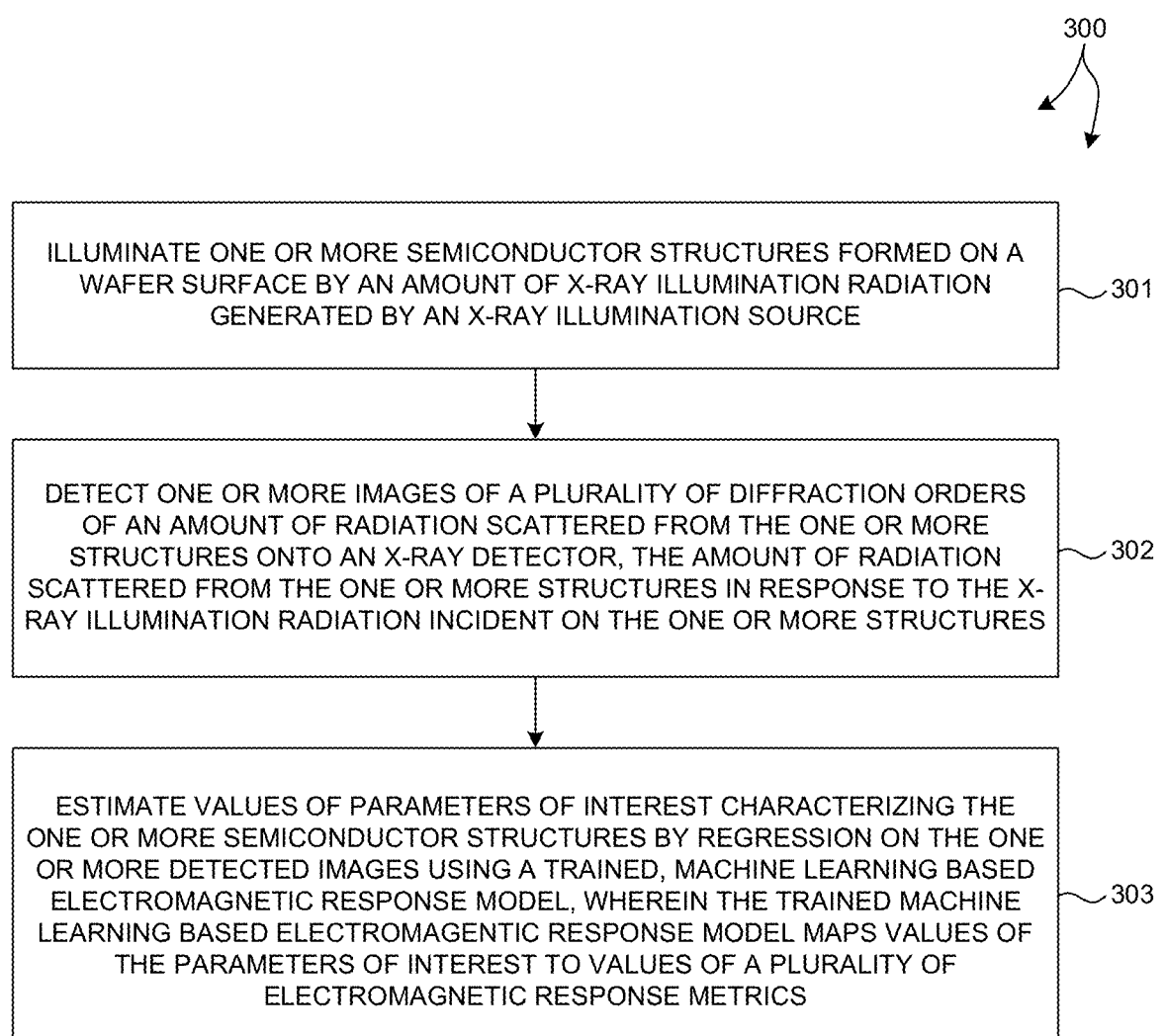
FIG. 12 depicts a flowchart illustrative of an exemplary method 300 of model based measurement as described herein.

FIG. 12 illustrates a method 300 suitable for implementation by the metrology systems 100 and 200 of the present invention. In one aspect, it is recognized that data processing blocks of method 300 may be carried out via a pre-programmed algorithm executed by one or more processors of computing system 130. While the following description is presented in the context of metrology systems 100 and 200, it is recognized herein that the particular structural aspects of metrology systems 100 and 200 do not represent limitations and should be interpreted as illustrative only.

In block 301, one or more semiconductor structures under measurement formed on a wafer surface are illuminated by an amount of x-ray illumination radiation generated by an x-ray illumination source.

In block 302, one or more images of a plurality of diffraction orders of an amount of radiation scattered from the one or more structures in response to the x-ray illumination radiation incident on the one or more structures are detected by an x-ray detector.

In block 303, values of parameters of interest characterizing the one or more semiconductor structures are estimated by regression on the one or more detected images using a trained, machine learning based electromagnetic response model.

X-ray based measurements of semiconductor structures as described herein may be performed on any number of different metrology systems, such as, but not limited to, x-ray transmission tools, x-ray reflection tools, infrared transmission tools, etc.

In a further aspect, x-ray scatterometry measurements are performed in accordance with a measurement recipe including a range of angles of incidence that provide sufficient resolution and depth of penetration to characterize high aspect ratio structures through their entire depth.

In a further aspect, a measurement recipe is implemented on a metrology system by communicating control commands that result in changes in state of one or more elements of the metrology system to implement the optimized measurement recipe.

In some examples, the control commands are provided to the illumination source. In response, the electrical state of the illumination source is adjusted to change the scanned spot size and shape, illumination power, spot offsets, incident angles, etc.

In some examples, the control commands are provided to one or more positioning devices that control the location of one or more optical elements of the metrology system. In response, the one or more positioning devices changes a position/orientation of one or more optical elements to adjust the incidence angles, focal distance between the illumination source and illumination optics, beam positioning, location of the beam spot on the optic to minimize the effects of surface roughness, etc.

Metrology systems and techniques are employed to measure structural and material characteristics associated with different semiconductor fabrication processes. In some examples, x-ray scatterometry measurements are performed to estimate values of critical dimensions, thicknesses, overlay, and material properties of high aspect ratio semiconductor structures including, but not limited to, spin transfer torque random access memory (STT-RAM), three dimensional NAND memory (3D-NAND) or vertical NAND memory (V-NAND), dynamic random access memory (DRAM), three dimensional FLASH memory (3D-FLASH), resistive random access memory (Re-RAM), and phase change random access memory (PC-RAM).

In some embodiments, x-ray detector 116 is maintained in the same atmospheric environment as specimen 101 (e.g., gas purge environment). However, in some embodiments, the distance between specimen 101 and x-ray detector 116 is lengthy and environmental disturbances (e.g., air turbulence) contribute noise to the detected signals. Hence in some embodiments, one or more of the x-ray detectors is maintained in a localized, vacuum environment separated from the specimen (e.g., specimen 101) by a vacuum window.

Similarly, in some embodiments, x-ray illumination source 110, illumination optics 115, or both, are maintained in the same atmospheric environment as specimen 101 (e.g., gas purge environment). However, in some embodiments, the optical path length between x-ray illumination source 110 and illumination optics 115 and the optical path length between illumination optics 115 and specimen 101 are long and environmental disturbances (e.g., air turbulence) contribute noise to the illumination beam. Hence in some embodiments, the x-ray illumination source, the illumination optics 115, or both, are maintained in a localized, vacuum environment separated from the specimen (e.g., specimen 101) by a vacuum window.

Figure 10:
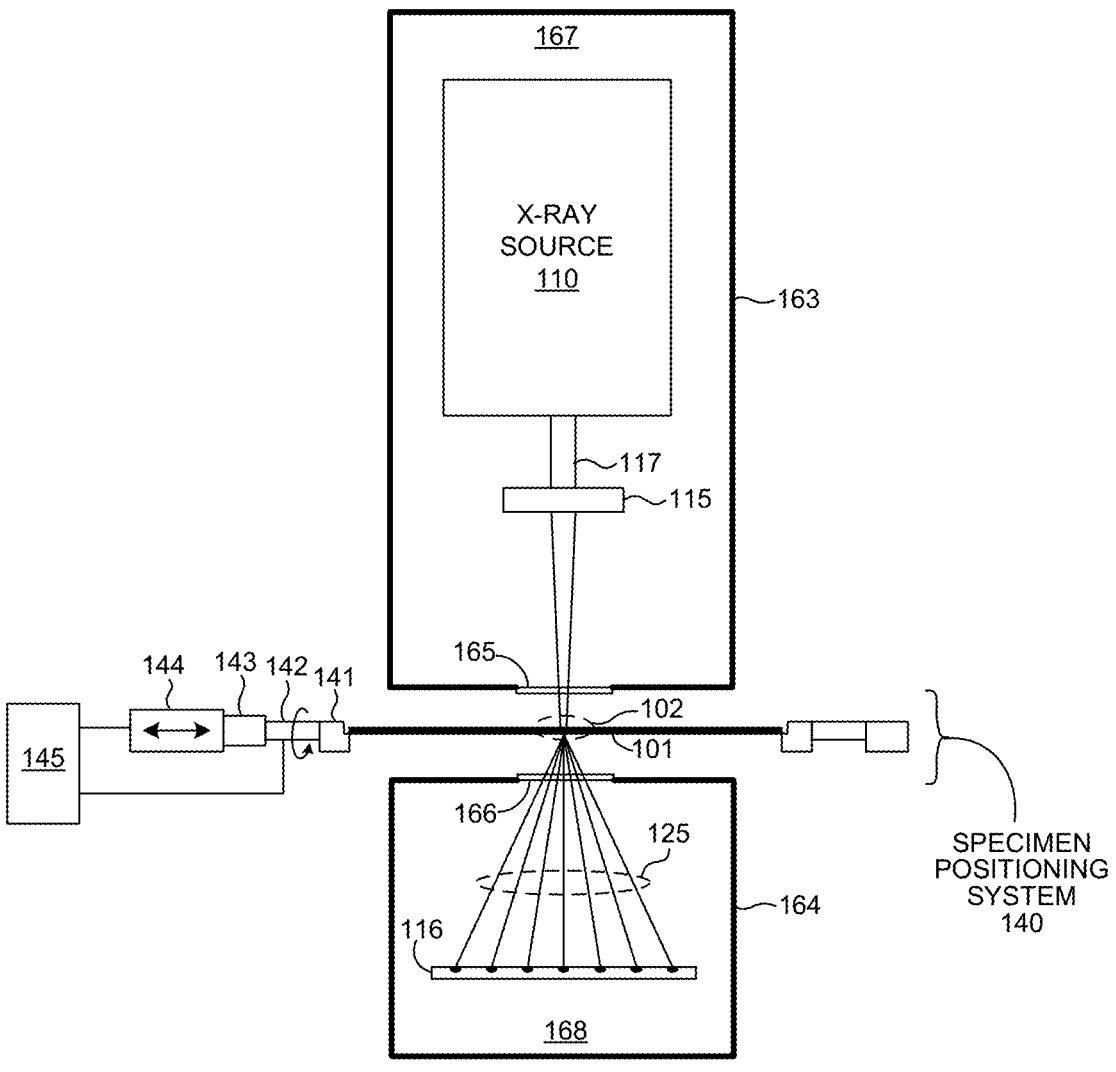
FIG. 10 is a diagram illustrative of elements of metrology systems 100 and 200 contained in vacuum environments separate from specimen 101.

FIG. 10 is a diagram illustrative of a vacuum chamber 163 containing x-ray illumination source 110 and illumination optics 115 and a vacuum chamber 164 containing x-ray detector 116 in one embodiment. In a preferred embodiment, vacuum chamber 163 includes a substantial portion of the optical path between x-ray illumination source 110 and specimen 101, and vacuum chamber 164 includes a substantial portion of the optical path between specimen 101 and x-ray detector 116. The openings of vacuum chamber 163 and vacuum chamber 164 are covered by vacuum windows 165 and 166, respectively. Vacuum windows 165 and 166 may be constructed of any suitable material that is substantially transparent to x-ray radiation (e.g., Beryllium). Illumination beam 117 passes through vacuum window 165 as it propagates toward specimen 101. After interaction with specimen 101, scattered x-ray radiation 125 passes through vacuum window 166, enters vacuum chamber 164 and is incident on x-ray detector 116. A suitable vacuum environment 167 is maintained within vacuum chamber 163 to minimize disturbances to the illumination beam 117, and a suitable vacuum environment 168 is maintained within vacuum chamber 164 to minimize disturbances to scattered x-ray radiation 125. A suitable vacuum environment may include any suitable level of vacuum, any suitable purged environment including an inert gas (e.g., helium), or any combination thereof. In this manner, as much of the beam path as possible is located in vacuum to maximize flux and minimize perturbations.

In some embodiments, the entire optical system, including specimen 101, is maintained in vacuum. However, in general, the costs associated with maintaining specimen 101 in vacuum are high due to the complexities associated with the construction of specimen positioning system 140.

In some embodiments, the metrology target characterized by x-ray scatterometry measurements as described herein is located within a scribe line of the wafer under measurement. In these embodiments, the metrology target is sized to fit within the width of the scribe line. In some examples, the scribe line width is less than eighty micrometers. In some examples, the scribe line is less than fifty micrometers. In general, the width of the scribe lines employed in semiconductor manufacturing is trending smaller.

In some embodiments, the metrology target characterized x-ray scatterometry measurements as described herein is located within an active die area of the wafer under measurement and is a part of a functional integrated circuit (e.g., memory, image sensor, logic device, etc.).

In general, a metrology target is characterized by an aspect ratio defined as a maximum height dimension (i.e., dimension normal to the wafer surface) divided by a maximum lateral extent dimension (i.e., dimension aligned with the wafer surface) of the metrology target. In some embodiments, the metrology target under measurement has an aspect ratio of at least twenty. In some embodiments, the metrology target has an aspect ratio of at least forty.

Figure 11A:
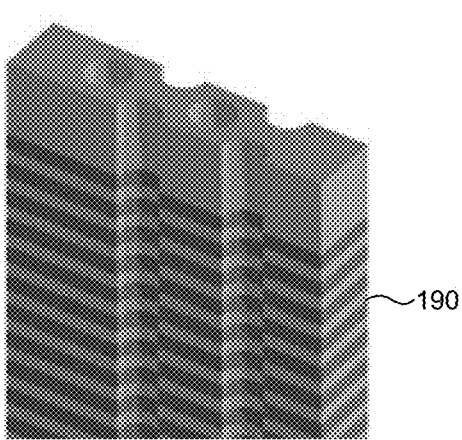
FIGS. 11A-11C depict an isometric view, a top view, and a cross-sectional view, respectively, of a typical 3D FLASH memory device 190 subject to measurement in the manner described herein.
Figure 11B:
Figure 11C:
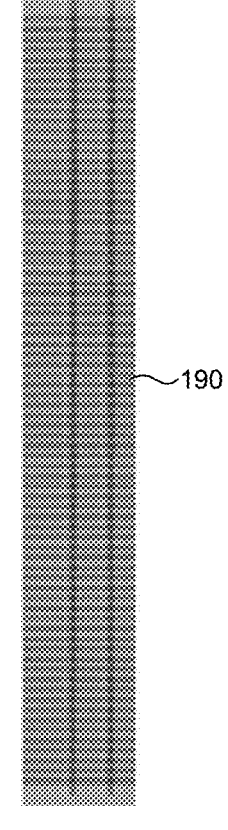

FIGS. 11A-11C depict an isometric view, a top view, and a cross-sectional view, respectively, of a typical 3D FLASH memory device 190 subject to measurement in the manner described herein. The total height (or equivalently depth) of memory device 190 ranges from one to several micrometers. Memory device 190 is a vertically manufactured device. A vertically manufactured device, such as memory device 190, essentially turns a conventional, planar memory device 90 degrees, orienting the bit line and cell string vertically (perpendicular to wafer surface). To provide sufficient memory capacity, a large number of alternating layers of different materials are deposited on the wafer. This requires patterning processes to perform well to depths of several microns for structures with a maximum lateral extent of one hundred nanometers or less. As a result, aspect ratios of 25 to 1 or 50 to 1 are not uncommon.

In general, the use of high brightness, x-ray scatterometry enables high flux x-ray radiation penetration into opaque areas of the target. Examples of measureable geometric parameters using x-ray scatterometry includes pore size, pore density, line edge roughness, line width roughness, side wall angle, profile, critical dimension, overlay, edge placement error, and pitch. An example of a measureable material parameter includes electron density. In some examples, x-ray scatterometry enables the measurement of features smaller than 10 nm as well as advanced semiconductor structures such as STT-RAM, V-NAND, DRAM, PC-RAM and Re-RAM, where measurements of geometrical parameters and material parameters are needed.

It should be recognized that the various steps described throughout the present disclosure may be carried out by a single computer system 130 or, alternatively, a multiple computer system 130. Moreover, different subsystems of the system 100, such as the specimen positioning system 140, may include a computer system suitable for carrying out at least a portion of the steps described herein. Therefore, the aforementioned description should not be interpreted as a limitation on the present invention but merely an illustration. Further, the one or more computing systems 130 may be configured to perform any other step(s) of any of the method embodiments described herein.

In addition, the computer system 130 may be communicatively coupled to the detector 116 and the illumination optics 115 in any manner known in the art. For example, the one or more computing systems 130 may be coupled to computing systems associated with the detector 116 and the illumination optics 115, respectively. In another example, any of the detector 116 and the illumination optics 115 may be controlled directly by a single computer system coupled to computer system 130.

The computer system 130 may be configured to receive and/or acquire data or information from the subsystems of the system (e.g., detector 116 and illumination optics 115, and the like) by a transmission medium that may include wireline and/or wireless portions. In this manner, the transmission medium may serve as a data link between the computer system 130 and other subsystems of the system 100.

Computer system 130 of the metrology system 100 may be configured to receive and/or acquire data or information (e.g., measurement results, modeling inputs, modeling results, etc.) from other systems by a transmission medium that may include wireline and/or wireless portions. In this manner, the transmission medium may serve as a data link between the computer system 130 and other systems (e.g., memory on-board metrology system 100, external memory, or external systems). For example, the computing system 130 may be configured to receive measurement data (e.g., signals 126) from a storage medium (i.e., memory 132 or 180) via a data link. For instance, spectral results obtained using a spectrometer of any of detector 116 may be stored in a permanent or semi-permanent memory device (e.g., memory 132 or 180). In this regard, the measurement results may be imported from on-board memory or from an external memory system. Moreover, the computer system 130 may send data to other systems via a transmission medium. For instance, specimen parameter values 170 determined by computer system 130 may be stored in a permanent or semi-permanent memory device (e.g., memory 180). In this regard, measurement results may be exported to another system.

Computing system 130 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 1, program instructions stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape.

In some embodiments, x-ray scatterometry measurements as described herein are implemented as part of a fabrication process tool. Examples of fabrication process tools include, but are not limited to, lithographic exposure tools, film deposition tools, implant tools, and etch tools. In this manner, the results of a measurement are used to control a fabrication process. In one example, x-ray scatterometry measurement data collected from one or more targets is sent to a fabrication process tool. The x-ray scatterometry measurement data is analyzed as described herein and the results used to adjust the operation of the fabrication process tool.

Scatterometry measurements as described herein may be used to determine characteristics of a variety of semiconductor structures. Exemplary structures include, but are not limited to, FinFETs, low-dimensional structures such as nanowires or graphene, sub 10 nm structures, lithographic structures, through substrate vias (TSVs), memory structures such as DRAM, DRAM 4F2, FLASH, MRAM and high aspect ratio memory structures. Exemplary structural characteristics include, but are not limited to, geometric parameters such as line edge roughness, line width roughness, pore size, pore density, side wall angle, profile, critical dimension, pitch, and material parameters such as electron density, composition, grain structure, morphology, stress, strain, and elemental identification.

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement.

As described herein, the term "metrology system" includes any system employed at least in part to characterize a specimen in any aspect, including measurement applications such as critical dimension metrology, overlay metrology, focus/dosage metrology, and composition metrology. However, such terms of art do not limit the scope of the term "metrology system" as described herein. In addition, the system 100 may be configured for measurement of patterned wafers and/or unpatterned wafers. The metrology system may be configured as a LED inspection tool, edge inspection tool, backside inspection tool, macro-inspection tool, or multi-mode inspection tool (involving data from one or more platforms simultaneously), and any other metrology or inspection tool that benefits from the calibration of system parameters based on critical dimension data.

Various embodiments are described herein for a semiconductor measurement system that may be used for measuring a specimen within any semiconductor processing tool (e.g., an inspection system or a lithography system). The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous $SiO_2$. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A metrology system comprising:
an x-ray illumination source configured to generate an amount of x-ray illumination radiation directed to one or more semiconductor structures under measurement formed on a wafer surface;
an x-ray detector configured to detect one or more images of a plurality of diffraction orders of an amount of radiation scattered from the one or more structures in response to the x-ray illumination radiation incident on the one or more structures; and
a computing system configured to:
estimate values of parameters of interest characterizing the one or more semiconductor structures by regression on the one or more detected images using a trained, machine learning based electromagnetic response model, wherein the trained machine learning based electromagnetic response model maps values of the parameters of interest to values of a plurality of electromagnetic response metrics; and
train the machine learning based electromagnetic response model based on a training data set including sets of Design Of Experiments (DOE) values of the parameters of interest and corresponding DOE values of a plurality of electromagnetic response metrics, wherein the training involves a regression on the training data set to minimize an objective function characterizing errors between the DOE values of the plurality of electromagnetic response metrics and values of the plurality of electromagnetic response metrics determined using the machine learning based electromagnetic response model.

2. The metrology system of claim 1, wherein each of the plurality of electromagnetic response metrics is any of a pixel intensity at the x-ray detector, a scattering coefficient, a scattering order efficiency, and a scattering order value in Q-space.

3. The metrology system of claim 1, wherein the regression on the one or more detected images includes a metrology system model, wherein the metrology system model maps the values of the plurality of electromagnetic response metrics to one or more images at the x-ray detector.

4. The metrology system of claim 1, the computing system further configured to:
determine the DOE values of the plurality of electromagnetic response metrics corresponding to each set of values of the parameters of interest by simulation using a physics based electromagnetic solver.

5. The metrology system of claim 1, wherein the training data set is derived from measurements performed by a trusted, reference metrology system.

6. The metrology system of claim 1, wherein the objective function is based on a residual value associated with each of the plurality of electromagnetic response metrics.

7. The metrology system of claim 6, the computing system further configured to:
scale the DOE values of a parameter of interest based on a range of values of the residual associated with each of the plurality of electromagnetic response metrics determined based on the range of DOE values of the parameter of interest.

8. The metrology system of claim 1, wherein the training involves reducing a dimension of the plurality of electromagnetic response metrics.

9. The metrology system of claim 1, wherein the regression involves any of a multi-seed regression, a multi-pass regression, and a regularized regression.

10. The metrology system of claim 1, the computing system further configured to:
select additional sets of DOE values of the parameters of interest based on the estimated values of the parameters of interest;
determine DOE values of the plurality of electromagnetic response metrics corresponding to each additional set of values of the parameters of interest by simulation using a physics based electromagnetic solver, the additional sets of DOE values of the parameters of interest and the corresponding DOE values of the plurality of electromagnetic response metrics comprising a second training data set;
train a second machine learning based electromagnetic response model based on the second training data set; and
estimate refined values of the parameters of interest characterizing the one or more semiconductor structures by regression on the one or more detected images using the second trained, machine learning based electromagnetic response model.

11. The metrology system of claim 1, the computing system further configured to:
estimate a goodness of fit between the DOE values of each of the plurality of electromagnetic response metrics and the values of each of the plurality of electromagnetic response metrics determined using the machine learning based electromagnetic response model, wherein the regression on the one or more detected images employs the trained, machine learning based electromagnetic response model to determine a value of a electromagnetic response metric of the plurality of electromagnetic response metrics if the goodness of fit associated with the electromagnetic response metric is greater than a predetermined threshold value, and wherein the regression on the one or more detected images employs a physics based electromagnetic solver to determine the value of the electromagnetic response metric of the plurality of electromagnetic response metrics if the goodness of fit associated with the electromagnetic response metric is less than a predetermined threshold value.

12. A method comprising:
illuminating one or more semiconductor structures formed on a wafer surface by an amount of x-ray illumination radiation generated by an x-ray illumination source;

detecting one or more images of a plurality of diffraction orders of an amount of radiation scattered from the one or more structures onto an x-ray detector, the amount of radiation scattered from the one or more structures in response to the x-ray illumination radiation incident on the one or more structures; and estimating values of parameters of interest characterizing the one or more semiconductor structures by regression on the one or more detected images using a trained, machine learning based electromagnetic response model, wherein the trained machine learning based electromagnetic response model maps values of the parameters of interest to values of a plurality of electromagnetic response metrics; and training the machine learning based electromagnetic response model based on a training data set including sets of Design Of Experiments (DOE) values of the parameters of interest and corresponding DOE values of a plurality of electromagnetic response metrics, wherein the training involves a regression on the training data set to minimize an objective function characterizing errors between the DOE values of the plurality of electromagnetic response metrics and values of the plurality of electromagnetic response metrics determined using the machine learning based electromagnetic response model.

13. The method of claim 12, wherein each of the plurality of electromagnetic response metrics is any of a pixel intensity at the x-ray detector, a scattering coefficient, a scattering order efficiency, and a scattering order value in Q-space.

14. The method of claim 12, wherein the regression on the one or more detected images includes a metrology system model, wherein the metrology system model maps the values of the plurality of electromagnetic response metrics to one or more images at the x-ray detector.

15. The method of claim 12, wherein the objective function is based on a residual value associated with each of the plurality of electromagnetic response metrics.

16. The method of claim 12, further comprising:

reducing a dimension of the plurality of electromagnetic response metrics.

17. The method of claim 12, further comprising:

scaling the DOE values of a parameter of interest based on a range of values of the residual associated with each of the plurality of electromagnetic response metrics determined based on the range of DOE values of the parameter of interest.

18. The method of claim 12, further comprising:

selecting additional sets of DOE values of the parameters of interest based on the estimated values of the parameters of interest;

determining DOE values of the plurality of electromagnetic response metrics corresponding to each additional set of values of the parameters of interest by simulation using a physics based electromagnetic solver, the additional sets of DOE values of the parameters of interest and the corresponding DOE values of the plurality of electromagnetic response metrics comprising a second training data set;

training a second machine learning based electromagnetic response model based on the second training data set; and estimating refined values of the parameters of interest characterizing the one or more semiconductor structures by regression on the one or more detected images using the second trained, machine learning based electromagnetic response model.

19. The method of claim 12, further comprising:

estimating a goodness of fit between the DOE values of each of the plurality of electromagnetic response metrics and the values of each of the plurality of electromagnetic response metrics determined using the machine learning based electromagnetic response model, wherein the regression on the one or more detected images employs the trained, machine learning based electromagnetic response model to determine a value of an electromagnetic response metric of the plurality of electromagnetic response metrics if the goodness of fit associated with the electromagnetic response metric is greater than a predetermined threshold value, and wherein the regression on the one or more detected images employs a physics based electromagnetic solver to determine the value of the electromagnetic response metric of the plurality of electromagnetic response metrics if the goodness of fit associated with the electromagnetic response metric is less than a predetermined threshold value.

20. A metrology system comprising:

an x-ray illumination source configured to generate an amount of x-ray illumination radiation directed to one or more semiconductor structures under measurement formed on a wafer surface;

an x-ray detector configured to detect one or more images of a plurality of diffraction orders of an amount of radiation scattered from the one or more structures in response to the x-ray illumination radiation incident on the one or more structures; and a non-transitory, computer-readable medium including instructions that when executed by one or more processors of a computing system cause the computing system to:

estimate values of parameters of interest characterizing the one or more semiconductor structures by regression on the one or more detected images using a trained, machine learning based electromagnetic response model, wherein the trained machine learning based electromagnetic response model maps values of the parameters of interest to values of a plurality of electromagnetic response metrics; and train the machine learning based electromagnetic response model based on a training data set including sets of Design Of Experiments (DOE) values of the parameters of interest and corresponding DOE values of a plurality of electromagnetic response metrics, wherein the training involves a regression on the training data set to minimize an objective function characterizing errors between the DOE values of the plurality of electromagnetic response metrics and values of the plurality of electromagnetic response metrics determined using the machine learning based electromagnetic response model.

* * * * *